J. E. WHITT.
COTTON TRAMPER.
APPLICATION FILED APR. 4, 1916.

1,235,088.

Patented July 31, 1917.

INVENTOR
J. E. WHITT.

BY Jack H. Ashley
ATTORNEY

J. E. WHITT.
COTTON TRAMPER.
APPLICATION FILED APR. 4, 1916.

1,235,088.

Patented July 31, 1917.
2 SHEETS—SHEET 2.

INVENTOR
J. E. WHITT.
BY
ATTORNEY

UNITED STATES PATENT OFFICE.

JOSEPH E. WHITT, OF ITALY, TEXAS.

COTTON-TRAMPER.

1,235,088.  Specification of Letters Patent.  Patented July 31, 1917.

Application filed April 4, 1916. Serial No. 88,781.

*To all whom it may concern:*

Be it known that I, JOSEPH E. WHITT, citizen of the United States, residing at Italy, in the county of Ellis and State of Texas, have invented certain new and useful Improvements in Cotton-Trampers, of which the following is a specification.

This invention pertains to improvements in cotton trampers.

In gin plants using electricity as a motive power it is highly important and very desirable to use said power wherever possible. In a great number of plants an air compressor is operated by an electric motor and compressed air is used to operate the tramper.

Owing to the peculiar elastic nature of cotton and its density when compressed it is not practical to employ an electric motor for operating the tramper head as the motor would have to be of excessive horse power to avoid "stalling" at the end of the down stroke and if such a motor was employed it would carry the tramper head down too fast during the first half of the down stroke. Further more current would be required to operate such a motor and the tramping would be jerky and accompanied by considerable vibration.

I have conducted experiments and found that with an electric motor developing less than five horse power and geared to drive an eccentrically mounted drum which is connected with the tramper head, I am able to tramp cotton efficiently, economically and with a smoothness of operation in which the vibration is reduced to a minimum.

The eccentric drum has a cable coiled therearound with its ends fastened to the upper and lower ends of the plunger, said cable also being fastened to the drum to prevent slipping. With the plunger at the upper end of this stroke the drum is positioned so that when the plunger is started down the cable will pay off the "high" side or at the point of least leverage; thus the plunger will start at its slowest speed which will be increased until it reaches its maximum speed at the center of the down stroke, at which point the cable will be paying off the "low" side of the drum and the latter will have completed a half revolution.

During this first half of the stroke the motor has been running at a steady rate of speed irrespective of the speed of descent of the plunger. After passing the center of the down stroke the cotton begins to offer resistance to the tramper head and thus the load thrown upon the motor is increased. However this is compensated by the increase in leverage and the decrease in speed as the cable is paid off of the drum during the last half of the revolution thereof, the greatest leverage being applied when the "peak" of the load is thrown upon the motor.

With this construction and combination the motor will run regularly and with the assistance of the drum will be able to handle any load encountered.

I have shown substantially the same construction and arrangement in my co-pending application filed April 12th, 1915, Serial Number 20,744, but have limited the claims therein to the electric motor and the starting and stopping mechanism; it being the purpose of the present application to cover the peculiar combination between the eccentric drum and a motor.

Other objects will be apparent from a perusal of the following specification and the invention will be more readily understood by reference to the accompanying drawings in which an example of the invention is illustrated and wherein.

Figure 1:
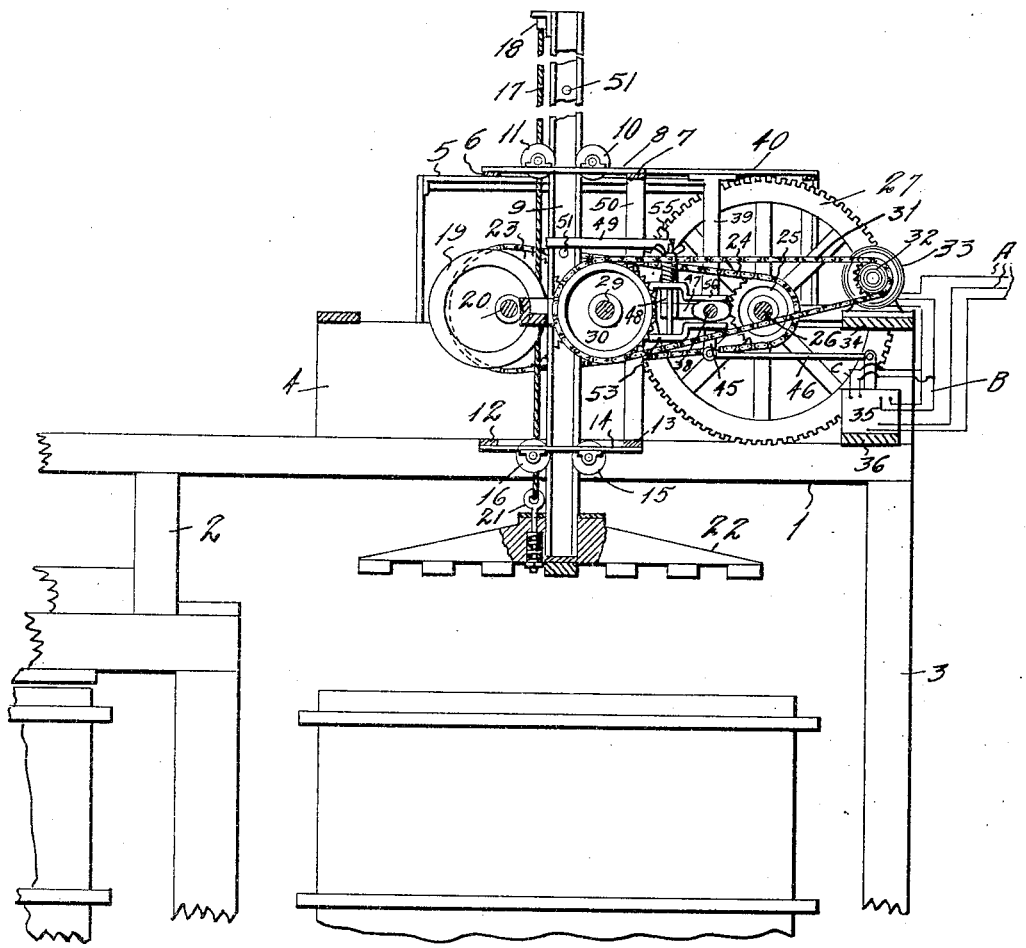
Figure 1 is a view of a portion of a cotton baling press with portions in elevation and section and showing in section the tramper apparatus herein described, said latter section being taken on the line $x$—$x$ of Fig. 2.

In order that a clear understanding of the invention may be had it is deemed advisable to describe the entire tramper construction the same as in the co-pending application hereinbefore referred to.

In the drawings the numeral 1 designates the tramper sills which are supported on uprights 2 and 3. On the sills 1 a pair of metal beams 4 are secured longitudinally of the sills. The entire tramping apparatus is mounted on and carried by these beams and thus may be installed on any make of cotton press.

A superframe 5 is mounted on the beams 4 and carries cross bars 6 and 7 which support at right angles bars 8. A vertically disposed plunger 9 is confined against lateral displacement between the bars by guide rollers 10 and 11 mounted on the bars 8 and engaging the plunger on opposite sides. The guide rollers are flanged as shown, there being one roller 10 and a pair of rollers 11, the latter being separated. At the bottom of the bars cross bars 12 and 13 are mounted similar to the bars 6 and 7 and support bars 14 at right angles similar to the bars 8. Guide rollers 15 and 16 engage opposite sides of the plunger, there being a pair of rollers 16 and a single roller 15.

A cable 17 has one end secured to a bracket 18 fixed to the upper end of the plunger 9. This cable extends down and is coiled around a drum 19 eccentrically fixed on a shaft 20 suitably mounted on the beams 4. The cable is attached at a proper point to the drum so as not to slip. The same cable passes off of the drum and is carried down to an eye bolt 21 yieldably mounted in the tramper head 22 carried by the plunger 9. The rollers 11 and 16 are arranged in separated pairs to permit the free passage of the cable and the yieldable eye bolt connection is provided to compensate any overthrow of the drum when the tramper head has reached the limit of its upward stroke.

Figure 3:
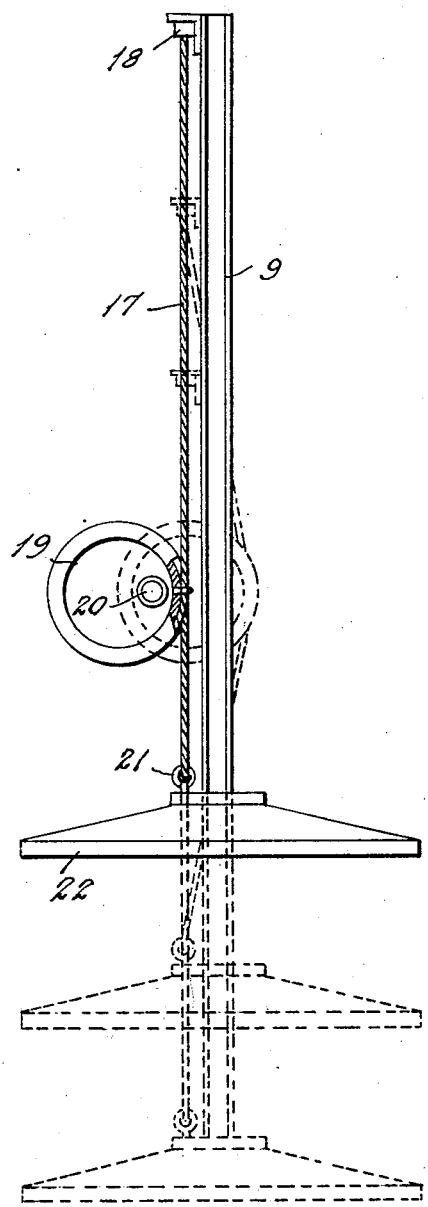
Fig. 3 is a diagrammatical view of the tramper head indicating the positions of the eccentric drum at each end of the stroke.
Figure 4:
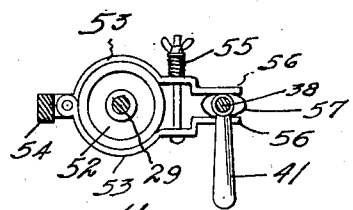
Fig. 4 is a detail of the brake mechanism.

By observing Figs. 1 and 3 it will be noted that when the tramper head is at the center of its stroke the drum 19 is positioned so that the cable 17 is paying off the "high" side or at its point of least leverage. When motion is imparted to the drum and the plunger is started down at its slowest speed, the drum being at its point of greatest leverage and the cable playing off the "low" side, the speed is gradually increased so that at the center of the down stroke the greatest speed is attained and the cable is paying off the "high" side as indicated in dotted lines in Fig. 3. After passing the center point the speed is gradually decreased but the power applied is increased, the maximum being reached when the "low" side of the drum is reached at which point the plunger and tramper head will be at the end of the down stroke. By this arrangement the power is increased by increasing the leverage and in proportion to the increase of the resistance offered by the cotton being packed; thereby permitting the use of a motor of minimum horse-power, as very little if any extra horse-power will be required from the motor when the "peak" of the load is reached. It is apparent that without this mechanism or its equivalent the motor would be subjected to an unequal load and would not operate satisfactorily.

The shaft 20 is driven by a large sprocket 23 fixed thereon and which is driven by an endless chain 24 passing about a smaller sprocket 25 fixed on a counter shaft 26 suitably mounted in bearings on the beams 4. A large gear 27 is fixed on the shaft 26 and meshes with a pinion 28 fixed on a drive shaft 29 suitably mounted in bearings on the beams 4. A large sprocket wheel 30 is fixed on the drive shaft and is driven by an endless chain 31 passing about the smaller sprocket 32 attached direct to the shaft of a motor 33. By observing Fig. 1 it will be evident that quite a speed reduction is had by the gearing arrangement just described. This is necessary in order to operate the tramper head at a comparatively slow rate of speed and use a direct motor drive.

Figure 5:
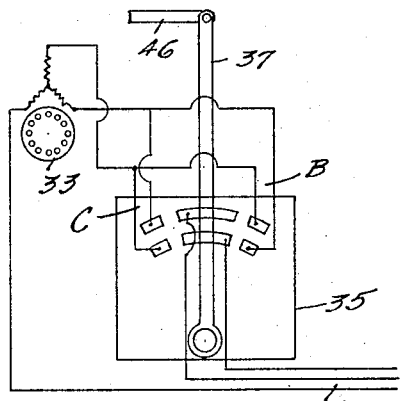
Fig. 5 is a diagrammatical view of the switch and motor circuits.

In tramping cotton in a press box the tramper head 22 is vertically reciprocated and where a motor is employed means for reversing said motor as well as automatically stopping it must be employed. The motor 33 is of the 3-phase type and is mounted on a cross plate 34 connecting the beams. Below the plate 34 a double-throw oil switch 35 of approved construction is mounted on the cross plate 36 extending between the beams 4 as shown in Fig. 1. In Fig. 5 a diagrammatical view of the switch and motor circuits are shown and in which A designates the power circuit which leads to the poles of a switch lever 37. A motor circuit B leads from contacts on one side of the switch lever to the motor; while a reversed circuit C leads from contacts on the opposite side of said lever to the motor. Normally the lever 37 occupies an intermediate or neutral position whereby the motor is idle and it is obvious that when said lever is swung to one side the motor will be energized and when swung in the opposite direction the first circuit will be broken and the circuit on the other side closed whereby the motor is reversed, but should the lever be arrested after breaking either contact the motor will stop.

Figure 2:
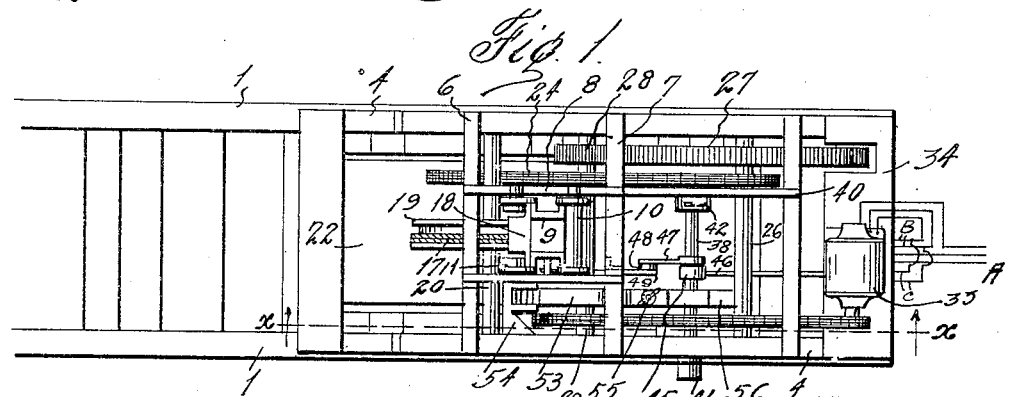
Fig. 2 is a plan view of the same.
Figure 6:
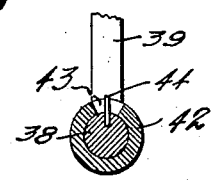
Fig. 6 is a sectional detail of the control shaft stop.

For operating and controlling the switch a controlling device is provided. This device comprises a rock shaft 38 having its inner end bearing in a hanger 39 depending from a bar 40 carried by the superframe 5. The forward end of the shaft projects over the front beam 4 and has fixed thereon a depending lever 41 by which the shaft may be manually rocked. As shown in Figs. 2 and 6 the hanger 39 has a collar 42 provided with an arcuate slot 43 into which a pin 44 projects from the shaft 38. It is obvious that the ends of the slot 43 limit the rocking movement of the shaft 38. An arm 45 is fixed on the rock shaft and depends therefrom in line with the lever 41. A link 46 is pivotally connected to and extends between the lower end of the arm 45 and the upper end of the switch lever 37. The operator by grasping the lever 41 and swinging the same rocks the shaft 38 and through the agency of the arm 45 and link 46 throws the lever 37 of the switch 35 into engagement with one of the contacts and closes one of the circuits whereby the motor is energized, the motor being reversed by swinging the lever 41 in the opposite direction.

When the motor is energized motion is transmitted to the drum 19 through the gearing herein before described and the plunger 9 reciprocated by the cable 17 whereby the tramper head 22 packs the cotton in the press box thereunder. It is obvious that automatic means must be provided for stopping the motor at each end of the stroke of the plunger 9, because should the operator not swing the lever 41 at the proper time the plunger would continue to travel and tear up the machine. For accomplishing this an arm 47 fixed on the shaft 38 projects horizontally from the same and has pivotal connection at its outer end with the lower end of a link 48 pivoted at its upper end to a horizontal lever 49 which is mounted on an upright 50 extending between the cross bars 7 and 13 as shown in Fig. 1. The lever 49 extends across the plunger 9 in the path of the pins 51 projecting from said plunger. These pins are positioned so as to engage the lever 49 at the extremities of the plunger stroke. Referring to Fig. 1 it will be seen that if the rock shaft is swung so that the arm 45 is moved to the right and the motor circuit B closed the free end of the lever 49 will be swung up and motion imparted to the parts so that the plunger 9 will be carried downward. When the tramper head reaches the extremity of its downward stroke should the operator forget or fail to swing the lever 41 to reverse the motor the upper pin 51 would engage the free end of the lever 49 and force it downward whereby the shaft 38 would be rocked and the switch lever swung to its neutral position and the motor stopped. It is obvious that should the operator attempt to swing the lever 41 so as to swing the lever 37 back into the same contact he would be unable to do so as the pin 51 locks the lever 49 against downward movement; thus the lever 41 can only be swung to the other contact whereby the motor is reversed and the plunger started on its upward stroke.

It will be apparent that some means for holding the tramper head in the position at which it is arrested when the motor is stopped, must be provided. For this purpose a brake-wheel 52 is fixed on the drive shaft 29. A pair of hinged brake shoes 53 surrounds the wheel and are pivoted on a bracket 54 projecting from one of the beams 4. The shoes are connected by a spring tension device 55 which causes them to normally bind on the wheel and hold the shaft 29 against rotation whereby the tramper head 22 is held in its arrested or suspended position. A pair of jaws 56 extend from the brake shoes and embrace a double-face cam 57 fixed on the rock shaft 38. When the rock shaft is swung in either direction the cam spreads the jaws 56 thus spreading the brake shoes and releasing the wheel 52 and the shaft 29. The brake acts when the motor is idle, but is released simultaneously with the energizing of the motor. When the switch 35 is "neutral" the brake is holding the tramper head by restraining the gearing, and when the switch is "thrown" by swinging the lever 41, the brake is released. It will be observed that the brake is applied when either of the pins 51 stop the motor.

The operation of the apparatus is the same as in all trampers; the cotton being fed to the press box and the lever 41 being swung to start the motor and reverse it to reciprocate the tramper to pack the cotton in the press box. The mounting of the motor directly on the tramper gives a unit power drive which is both economic and desirable.

It is obvious that a distinct method of tramping cotton has been evolved and I believe I am the first to provide a motor driven tramper in which the power is delivered to the plunger in proportion to the increase in the load and in which the speed of travel of the plunger or tramper head is increased under the minimum load and decreased as the load increases; the increase and decrease being effected by mechanical means of a leverage type.

Having described my invention, what I claim, is:

In a cotton tramper, a reciprocating tramper head, an eccentrically mounted drum, a flexible connection coiled about the drum and fastened thereto at a point nearest the axis of rotation and having its ends secured to the extremities of the head, whereby the head is started at the beginning of its stroke at a minimum speed and increases the speed gradually to a maximum at the middle of the stroke and then decreases the speed to a minimum at the end of the stroke, in both directions.

In testimony whereof I affix my signature.

JOSEPH E. WHITT.

Copies of this patent may be obtained for five cents each, by addressing the "Commissioner of Patents, Washington, D. C."